(12) United States Patent
Röer et al.

(10) Patent No.: US 10,309,375 B2
(45) Date of Patent: Jun. 4, 2019

(54) WIND TURBINE

(71) Applicant: Wobben Properties GMBH, Aurich (DE)

(72) Inventors: Jochen Röer, Ganderkesee (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 599 days.

(21) Appl. No.: 14/441,813

(22) PCT Filed: Oct. 16, 2013

(86) PCT No.: PCT/EP2013/071623
§ 371 (c)(1),
(2) Date: May 8, 2015

(87) PCT Pub. No.: WO2014/072157
PCT Pub. Date: May 15, 2014

(65) Prior Publication Data
US 2015/0308414 A1    Oct. 29, 2015

(30) Foreign Application Priority Data
Nov. 9, 2012 (DE) .......................... 10 2012 220 502

(51) Int. Cl.
*F03D 1/00* (2006.01)
*F03D 7/02* (2006.01)
(Continued)

(52) U.S. Cl.
CPC ............... *F03D 80/88* (2016.05); *F03D 1/00* (2013.01); *F03D 7/0204* (2013.01); *F03D 9/25* (2016.05); *F03D 13/20* (2016.05); *F03D 80/00* (2016.05); *F03D 80/70* (2016.05); *F03D 80/82* (2016.05); *F05B 2240/912* (2013.01); *F05B 2260/64* (2013.01); *F16C 2360/31* (2013.01); *Y02E 10/723* (2013.01); *Y02E 10/728* (2013.01)

(58) Field of Classification Search
CPC .......... F03D 11/0008; F03D 9/25; F03D 1/00; F03D 7/0204; F03D 13/20; F03D 80/70; F03D 80/82
See application file for complete search history.

(56) References Cited

U.S. PATENT DOCUMENTS 6,814,493 B2    11/2004    Wobben
7,417,332 B2     8/2008    Malakhova et al.
(Continued)

FOREIGN PATENT DOCUMENTS

CN    101929426 A    12/2010
EP    1 319 830 A1    6/2003
(Continued)

*Primary Examiner* — Justin D Seabe
*Assistant Examiner* — Julian B Getachew
(74) *Attorney, Agent, or Firm* — Seed Intellectual Property Law Group LLP

(57) ABSTRACT

The invention relates to a wind energy plant with a nacelle, a generator located in the nacelle, a tower and a yaw bearing to adjust the nacelle orientation into the wind, such that the yaw bearing is located under the nacelle in a vertical yaw displacement and the nacelle is supported on the yaw bearing above a vertical shaft section of the same length as the yaw displacement.

4 Claims, 3 Drawing Sheets

(51) Int. Cl.
*F03D 9/00* (2016.01)
*F03D 80/80* (2016.01)
*F03D 80/00* (2016.01)
*F03D 80/70* (2016.01)
*F03D 13/20* (2016.01)
*F03D 9/25* (2016.01)

(56) References Cited

U.S. PATENT DOCUMENTS

| | | | |
|---|---|---|---|
| 8,203,230 B2 | 6/2012 | Hennig | |
| 8,502,405 B2 | 8/2013 | Hirai et al. | |
| 8,506,247 B2 | 8/2013 | Stiesdal | |
| 2008/0272604 A1 | 11/2008 | Versteegh | |
| 2009/0167023 A1* | 7/2009 | Nies | F03D 13/20 290/55 |
| 2009/0263245 A1* | 10/2009 | Shi | F03D 7/02 416/43 |
| 2010/0109327 A1* | 5/2010 | Nielsen | F03D 7/0204 290/44 |
| 2011/0109100 A1* | 5/2011 | Versteegh | F03D 11/00 290/1 B |
| 2011/0163545 A1* | 7/2011 | Hirai | B01D 46/0086 290/44 |
| 2011/0233939 A1 | 9/2011 | Noda et al. | |
| 2011/0316286 A1 | 12/2011 | Hennig | |
| 2012/0133148 A1 | 5/2012 | Romeo | |
| 2012/0134841 A1* | 5/2012 | Madge | F03D 7/0204 416/244 R |

FOREIGN PATENT DOCUMENTS

| | | |
|---|---|---|
| EP | 1 247 021 B1 | 4/2004 |
| EP | 1 736 665 A2 | 12/2006 |
| EP | 2 075 454 A2 | 7/2009 |
| JP | 201147359 A | 3/2011 |
| JP | 201213078 A | 1/2012 |
| KR | 1020110084958 A | 7/2011 |
| KR | 1020110112427 A | 10/2011 |
| KR | 1020120001652 A | 1/2012 |
| RU | 95754 U1 | 7/2010 |
| RU | 2423716 C2 | 7/2011 |
| WO | 2010150367 A1 | 12/2010 |
| WO | WO 2012000504 A1 * | 1/2012 ........... F03D 7/0204 |

* cited by examiner

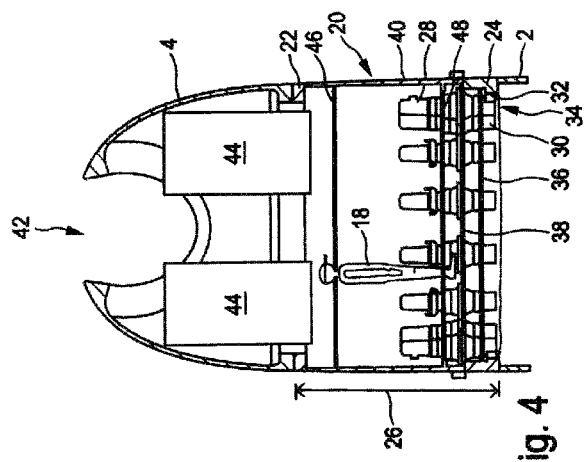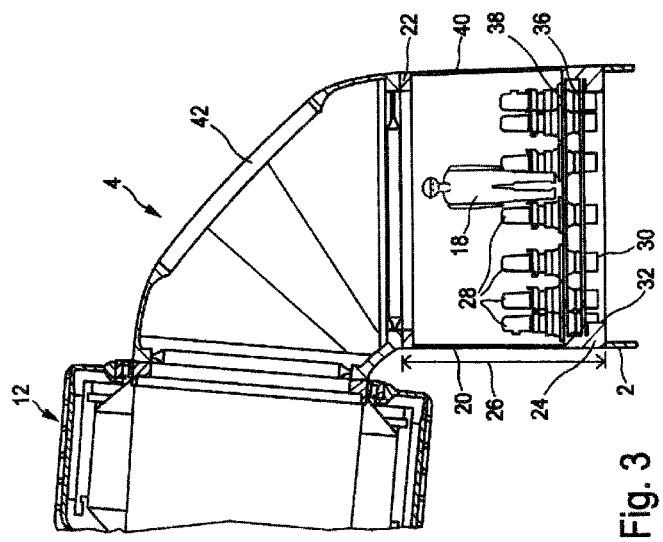

ance with the invention that is not explicitly stated here.

WIND TURBINE

BACKGROUND

Technical Field

This invention relates to a wind turbine or wind energy plant and a shaft section of a wind energy plant and a method for designing a wind energy plant.

Description of the Related Art

Wind energy plants or wind turbines are well known and convert wind energy into electrical energy. A typical wind energy plant has a tower with a nacelle on it, which contains an aerodynamic rotor and an electric generator. The nacelle is mounted on a yaw bearing in order to be able to turn on a horizontal plane, so that the angle of the yaw can be adjusted to the wind. This type of yaw bearing has to withstand enormous forces because it has to support the entire nacelle. This type of nacelle can weigh several hundred tons depending on the construction. Wind pressure on the wind energy plant rotor can also add to the load causing a tilting moment, and therefore putting an additional load onto the yaw bearing.

The European patent application EP 1 247 021 B1 shows that segmented, fixed but detachable mounted slide elements can be used for a yaw bearing to counter the effect of a high yaw bearing load so that the slide supports can be easily replaced. This means that repair costs arising from wear to a yaw bearing can be reduced. The cause of wear is, however, not eliminated by doing this.

The German Patent and Trademark Office has researched the following prior art in the priority application for this application: US 2012/0133148 A1 and EP 2 075 464 A2.

BRIEF SUMMARY

One or more embodiments are directed to methods and devices for reducing the yaw bearing load. At least one alternative solution should be proposed.

In accordance with one embodiment the invention, a wind energy plant that includes a nacelle containing a generator, a tower and a yaw bearing to adjust the orientation of the nacelle to the wind is proposed.

The yaw bearing is therefore located under the nacelle in a vertical displacement. This vertical displacement is referred to here as the yaw displacement. The nacelle is supported on the yaw bearing above a perpendicular shaft section of the same length as the yaw displacement. Therefore, a perpendicular shaft section is planned between the nacelle and the yaw bearing to create the yaw displacement between the nacelle and the yaw bearing.

This is a departure from the previously standard way of doing this, where the yaw bearing was positioned above on the tower and the nacelle was mounted directly onto it. In this way, a nacelle cover in the area of the tower, namely above in the area of the tower top and yet still slightly beneath the nacelle, was usually sufficient and could thereby protect the yaw bearing from the effects of the weather. There was often also an air intake at this point for sucking in outside air through the space between the tower and the nacelle cover.

However, it was now recognized that particularly bending or tilting moments in the area of the yaw bearing led to increased load on the yaw bearing. There are two particular reasons for bending and tilting moments in the yaw bearing area.

Firstly, the weight of the generator, which is increased further by the weight of the rotor blades, puts the center of gravity in the nacelle a distance from the tower. This is particularly to be understood in relation to an intended orientation to the wind, seen from the wind direction. This causes what is known as a pitching moment. This pitching moment is a static moment that results from the weight of the nacelle and the center of gravity. During operation, the wind energy plant therefore has a pitching moment towards the wind.

Another moment to consider is a thrust moment, which results from wind pressure on the wind energy plant, specifically on the rotor blades. The thrust moment is a dynamic moment, which depends on the operation of the wind energy plant and specifically on the prevailing wind.

The thrust moment depends on the tower height being considered. Thrust moment load decreases with tower height, whereas the pitching moment remains constant over the height of the tower. These two moments are therefore opposites, where the pitching moment specifically results in a moment in the direction into the wind and the thrust moment results in a moment away from the direction of the wind. These two moments interfere with one another, and right at the top of the tower the pitching moment is dominant, whereas below at the foot of the tower, the thrust moment is dominant. Therefore, at least theoretically, there is an area or a point at which both moments nullify or cancel each other out. It is in exactly this area, at this height on the tower that embodiments of the present invention propose to position the yaw bearing. Of course, the yaw bearing will continue to support the weight of the nacelle with a generator and rotor blades as it did before, but any tilting or bending moment that occurs will at least be lower than right on the top of the tower, which is also dependent on the wind.

The effect being described occurs particularly strongly if the center of gravity, and specifically the generator, is positioned in front of the yaw bearing, with respect to pure consideration in a horizontal direction. Positioning in front of the yaw bearing therefore involves positioning in front of, but simultaneously above, the yaw bearing. In other words, the generator will be freely supported before the tower, at least in the area of the top of the tower, and freely supported before the yaw bearing. Thus, there will basically be nothing beneath the nacelle in the area of the generator. If necessary, below at the tower base, the wind energy plant can be wide enough that here a section of the tower is located beneath the generator. However, the nacelle and its generator are fully located in the area of the top of the tower, as per the embodiment described.

In any case, it is advantageous for this type of wind energy plant nacelle if the yaw bearing is mounted further down, ideally where the pitching moment and the thrust moment cancel each other out. As the pitching moment is static and therefore basically constant, whereas the thrust moment depends on the wind pressure and therefore on the prevailing wind and on the operational status of the wind energy plant, the tilting or bending moment at the yaw bearing cannot, unfortunately, be kept permanently at zero. Nonetheless, it is possible to minimize the tilting or bending moment in the area of the yaw bearing by appropriately positioning the yaw bearing. To achieve this, it is proposed using an average thrust moment as a basis, namely and specifically an anticipated average thrust moment. This may depend on the site and the plant. However, the expected wind range is normally known prior to the installation of the wind energy plant, as is how to set up the plant to deal with this. It also specifically comes down to the position of the rotor blades if these are adjustable. Alternatively, the definition of the thrust moment necessary for the calculation can be based on a predefined wind speed, such as a nominal wind. To do so, for a particularly ideal nominal wind, a thrust moment and a pitching moment are calculated and interfered, and the interference is assessed on the basis of the tower height. The point at which this interference has a value of 0 is being proposed as the location for the yaw bearing.

Nevertheless, by doing this, a general height position can be determined for the yaw bearing for a particular type of turbine. The wind loads and therefore the thrust moment indeed depend on the installation site. As wind energy plants are, however, laid out on the basis of specific wind classes, a particular wind energy plant type therefore can basically be used for the same wind class, a specified height position for the yaw bearing can be used as basis for the height of all wind energy plants of this type. In this way, the same wind energy plant can be used for different tower heights, with the wind energy plant type therefore only varying depending on tower height, and the height of the yaw bearing can be specified in relation to the nacelle. Accordingly, it is also proposed that the yaw bearing be positioned with the yaw displacement to the nacelle described, specifically independently of the overall tower height. Values in the range of 2.5 m have been calculated as good values for yaw displacement. In any case, reducing the height of the yaw bearing compared to previous wind energy plants by approximately 2.5 m is already beneficial, even if the optimum height might vary by a few centimeters or even by half a meter depending on specific marginal conditions. Therefore, it is preferably proposed to select a yaw displacement in the range of 2 to 3 m. In any case, using a yaw displacement of 1.5 m to 5 m should have a positive effect.

It should be noted that nominal wind speed, which is shortened to nominal wind, is the wind speed used by the wind energy plant to set its nominal operating point. Typically, at wind speeds below the nominal wind speed or up to the nominal wind speed, a wind energy plant operates in what is known as partial load operation, such that the wind energy plant has no rated speed or any rated power. In pitch-regulated systems, in which the rotor blade angle can be adjusted or pitched, a constant rotor blade angle is usually based on the partial load range. From and above the nominal wind speed, the nominal wind speed is ultimately only a mathematical point, as the wind energy plant operates at rated speed and/or rated power. In a pitch-regulated system, the rotor blade angle is adjusted at this point to be able to maintain the nominal wind speed, until it needs to be throttled off or shut down at higher wind speeds. The above remarks refer to just such a nominal wind speed. However, it can typically be assumed that the nominal wind speed may be in the range of 12 to 17 m/s.

It is preferably proposed that multiple yaw motors be mounted in a fixed manner in the shaft section to affect nacelle orientation on the shaft section, and in conjunction engage with a cog with internal teeth, which is fixed to the tower, in order to effect a rotating movement of the shaft section and therefore also of the nacelle relative to the tower. Using the proposed, lower lying position of the yaw bearing simultaneously creates the possibility of using yaw drives or yaw motors in this shaft section to achieve the distance between the nacelle and the yaw bearing. This can provide an additional advantage, namely that there is now more space in the nacelle area, where the yaw drives were previously located. This fundamentally displaced position of the yaw drive from the nacelle may also improve overall electromagnetic compatibility, abbreviated as EMC, inside the nacelle. This improvement can be achieved due to the distance of the yaw drives from the nacelle, the correspondingly distanced position of the cables and if necessary also the control module. If necessary, the EMC situation can also be improved by the overall additional distribution of yaw drives. It is therefore proposed that the yaw drives be positioned as uniformly as possible in a circular, specifically in an equidistant layout and/or on the exterior of the shaft section. This improves electromagnetic compatibility due to the yaw drives receiving less interference from electrical systems inside the nacelle.

Preferably, at least 8 and specifically at least 10, preferably exactly 14 yaw drives will be used. First of all, using the shaft section offers the possibility of installing this number of yaw drives and engaging with a cog, i.e., specifically the proposed cog with internal teeth. This allows for the distributed forces of the individual yaw drives to be balanced. Existing solutions that use yaw drives in the nacelle are often superstructures in the nacelle, i.e., the mainframe, which have prevented a uniform layout of the yaw drives. The proposed option therefore also achieves a uniform and therefore low-wear distribution of the required forces for yaw adjustment.

Pursuant to an embodiment, the shaft section has openings to take yaw drives. Specifically, for every yaw drive there are two openings arranged vertically above one another, in each of which one yaw drive will be inserted and attached in the direction of its rotation axis. Arranging the yaw drives in this way can therefore be set up in this shaft section. Preferably, the openings will be arranged around the external wall of the shaft section and fixed to it, such that this external wall is preferably the only wall of the shaft section. By using multiple yaw drives and therefore multiple openings for yaw drives, which are fixed to the wall, a uniform attachment to the wall is also possible, which unlike fewer uneven fixing points weakens this wall less. Alternatively, an appropriate fixing ring can be used in the shaft section for the yaw bearing which contains these yaw openings.

The shaft section therefore is also a type of tower extension or part of the tower which rotates relative to the tower. It is ultimately unimportant whether this shaft section is assigned to the tower or to the nacelle. The shaft section is a separate element, which can also be referred to as the yaw module. This yaw module is firmly attached to the nacelle located above it; this may be achieved for example by bolting it to a flange section. In any case, this shaft section is being proposed as a separate element which will preferably also be manufactured separately. This means the manufacturing process of a nacelle mainframe can also be simplified, if this mainframe (which can also be a nacelle) no longer has to be made to accept yaw drives, and also has more space available inside it.

Pursuant to an embodiment, it is proposed for the shaft section and therefore also for the wind energy plant that the shaft section is made in a tubular shape, specifically in a cylindrical shape. Regarding its external shape, the shaft section is basically a cylinder section or a tubular, slightly conical section opposite a cylinder section, the external diameter of which corresponds roughly to the upper tower area. An external or side view of the wind energy plant therefore also shows the shaft section basically to be the topmost end of the tower. Such a tubular, specifically cylindrical, shaft section can be manufactured uniformly and comparatively easily, and allows the placement of many yaw drives in a large circular area and is well adapted to attaching a yaw bearing.

Pursuant to another embodiment, it is proposed that the shaft section has at least one cooling vent for sucking outside air into the wind energy plant. This shaft section offers sufficient space to arrange such ventilation openings, which can be created in advance during the manufacturing process, such as for example using casting for the entire shaft section or by attaching them later. Likewise, there is space for a proposed interceptor or filter to intercept humidity and/or to filter out impurities in the outside air. It is accordingly proposed that the outside air be sucked into the wind energy plant, such that the fans involved may also be located in another position, such as for example inside the nacelle, and can therefore be used to cool dried and purified outside air inside the nacelle.

The advantage of this is that a previously known system for sucking outside air into an annular clearance between the tower and nacelle cover can be easily adapted for use with this shaft section, because the transfer of the outside air sucked in for cooling in the nacelle area can remain unchanged. Sucking outside air into this shaft section, and therefore high up into the tower, specifically avoids sucking in air from close to the ground, which also tends to be warmer and to contain more impurities. Moreover, it avoids a corresponding layout of ventilation openings including interceptors in the nacelle. This offers more freedom in nacelle design and specifically means the nacelle is not weakened by such openings.

A method for designing a wind energy plant is also proposed. This method relates to determining the layout of the yaw bearing in a vertical direction, therefore specifically to the distance between the yaw bearing and the underside of the nacelle. It is first assumed here that the wind energy plant has already been chosen on its merits, specifically that an already known wind energy plant type can be assumed, which is expected only be improved with regards to the position of the yaw bearing. In this way, the claimed method for designing a wind energy plant can also be understood to be a method for changing a wind energy plant. According to this, it is proposed that an anticipated height-dependent thrust moment be determined for the wind energy plant, specifically for nominal operation of the wind energy plant. This therefore includes a function or at least a stream of data for the thrust moment. For example, this may be done using a simulation, or where an existing system is being improved, may draw on measurements, or measurements intended for this can be included. The pitching moment can be considered to be a fixed value.

Alternatively, an extensive dataset or a function curve of the thrust moment can be included for very varied anticipated operating conditions, in order to calculate an average thrust moment. Furthermore or alternatively, it can be calculated in advance which operating state is expected to be the most frequent or the most representative or which has already occurred in a comparable system. The thrust moment can be determined on the basis of this.

Depending on the pitching moments and thrust moments determined this way, or on the height-dependent pitching moment and height-dependent thrust moment, respectively, a height position will be calculated, at which the total of the pitching moment and the thrust moment is a minimum value, i.e., is zero, and this position will then be used as the height position for the yaw bearing. This height position is specifically described in relation to the nacelle, therefore as the yaw displacement from the yaw bearing to the nacelle. Accordingly, this result also determines the size, namely the axial length of the required shaft section.

BRIEF DESCRIPTION OF THE SEVERAL VIEWS OF THE DRAWINGS

The invention is now described in more detail below, using embodiments as examples with reference to the accompanying figures.

FIG. 3 shows a schematic side view of a wind energy plant shaft section and a part of a wind energy plant nacelle according to an embodiment.

FIG. 4 shows a very similar embodiment to FIG. 3 in a sectional view from the front.

DETAILED DESCRIPTION

Below, similar elements may be described with similar but not identical embodiments to illustrate overall functionality using the same reference numbers.

Figure 1:
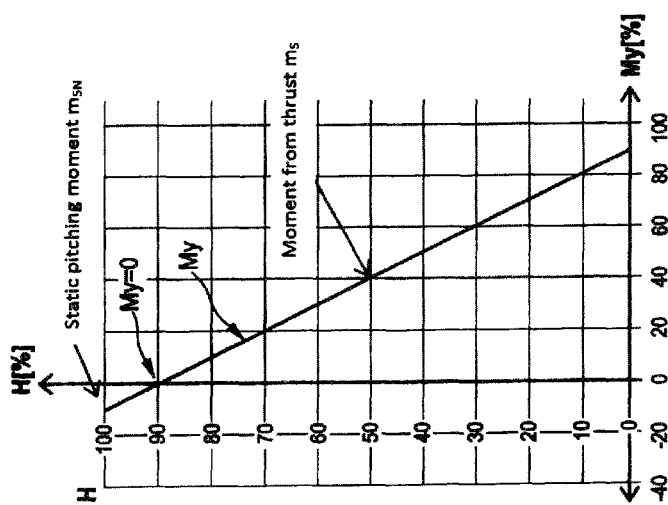
FIG. 1 shows a diagram illustrating a height-dependent bending moment.

The diagram in FIG. 1 shows the tower bending moment My as a function of height. Here, the bending moment My can also be referred to as tower collective My. However, to better illustrate it, the bending moment My on the abscissa and the tower height on the ordinate are removed. The bending moment My is therefore shown in scale to the maximum thrust moment in % and the height is scaled to the overall tower height as a %. The diagram in FIG. 1 is an illustration and therefore shows a linear pathway of bending moment My.

It should be clear to see, or be illustrated by the diagram, that the bending moment is greatest at the base of the tower, i.e., at height H=0. The value here is approximately 90% and it should be illustrated that the 100% value of the thrust moment will not be reached because the pitching moment must be removed.

At the top of the tower, therefore at H=100%, the bending moment My reaches its smallest absolute value of approximately −10%. Here, the thrust moment is approximately 0% and the static pitching moment is approximately 10%, but with a minus sign.

At a tower height of H=90%, as illustrated in this drawing, the static pitching moment and the thrust moment, i.e., the moment from thrust, cancel each other out and their total is therefore 0. The diagram illustrates the area for the static pitching moment $m_{SN}$ where this is dominant, i.e., at a height of H=100%. For the thrust moment $m_S$, there is basically the remaining tower height area, i.e., the dominant area specifically for values clearly under H=90%, which is illustrated by a corresponding arrow "moment from thrust" $m_S$.

The illustrative diagram from FIG. 1 shows a bending moment My=0 at H=90%, which is however only an illustration and does not reflect the concrete value of a realistic wind energy plant. Furthermore, the corresponding value is expected at an even higher height, i.e., at 95% or even higher. The diagram shows this intersection with the ordinate, i.e., the value My=0 at H=90%, in order to make it clearer.

Figure 2:
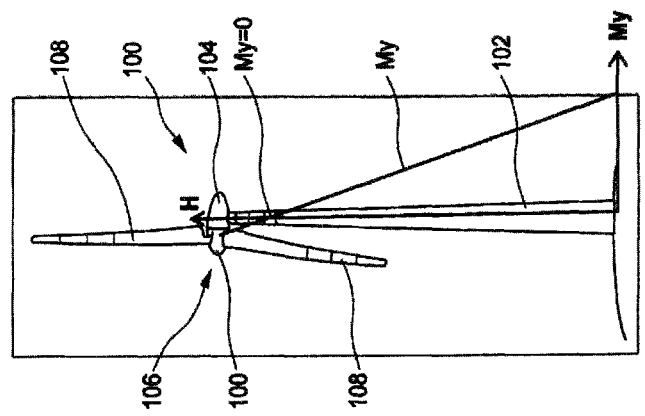
FIG. 2 illustrates a reference to the diagram in FIG. 1 of a wind energy plant.

The diagram in FIG. 1 is recorded, without dimensions, in the illustration in FIG. 2, which shows a wind turbine or a wind energy plant 100 with a tower 102, a nacelle 104, with a rotor 106 and three rotor blades 108, one of which cannot be seen, and a spinner 110. The diagram is intended to illustrate that the bending moment My under the nacelle 104 is 0, and that therefore the yaw bearing would preferably be located there. Even FIG. 2 is only an illustration, at least in relation to the diagram marked, and the value My=0 would be further up towards the nacelle but still beneath the nacelle.

FIG. 3 shows, in a side view, a part of a nacelle 4, which has a generator 12, which is here shown as an external runner type. The aerodynamic rotor with rotor blades is attached to the generator 12, which is not shown in this illustration in FIG. 3.

FIG. 3 is intended to illustrate a shaft section 20, which is connected at the top via a ring-shaped nacelle connector flange 22 to the nacelle 4, and the nacelle 4 is therefore supported on the shaft section 20. Below, the shaft section 20 is connected to the tower 2 via the yaw bearing 24. Only the upper part of the tower 2 is shown.

A comparator 18 is shown in the shaft section 20 to clarify the scale of the shaft section 20. Here, the distance from the nacelle connection flange 22 to the yaw bearing 24 is shown as yaw displacement 26 and is approximately 2.5 m in the example shown, as clarified by comparison to the comparator 18.

Figure 5:
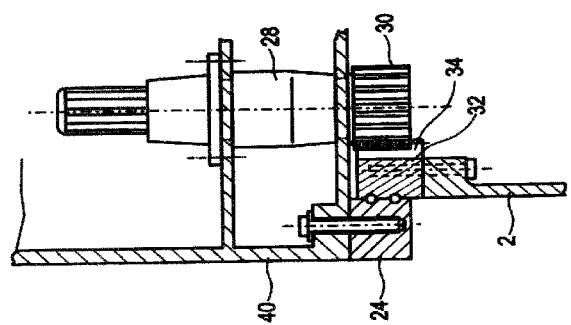
FIG. 5 shows a section of FIG. 3.

In the shaft section 20 in the example shown, there are 14 yaw drives 28 altogether, 7 of which can be seen in the sectional view. Each yaw drive 28 has a sprocket 30, which meshes with a cog 32 with internal teeth in a meshing area 34. This meshing area, the yaw bearing 24, the sprocket 30 and part of the yaw drive 28 are shown on a larger scale in FIG. 5.

FIG. 3 also shows that the yaw drives 28 are supported in two annular holding plates 36 and 38. The yaw drives 28 are arranged around the external sheath 40 of the shaft section 20 in an inwards direction and there is a lot of room in the middle to walk on the shaft section 20. Likewise, electrical cabling and an elevator could be installed here, to specify just a few items.

FIG. 4 shows a very similar shaft section 20 to the one in FIG. 3, so the same reference numbers are used here. In FIG. 4, the sectional view shows a perspective of the generator 12 to the nacelle opening 42. Moreover, for the purposes of illustration, two open spaces 44 are illustrated by two rectangles. These open spaces 44 are intended to clarify that using the proposed design will also create a lot of space which can be used for different installations. These open spaces 44 partially project into the shaft section 20. In order to also create an accessible area, a floor panel 46 can be used, which may contain an opening to allow access up through it. An additional floor panel 48 may be used in the lower part of the shaft section 20. The comparator 18 illustrated is only intended to give an indication of scale. The open space(s) 44 is/are only larger than in other designs because the yaw bearing is now positioned lower down.

The only difference between the shaft section 20 in FIG. 4 and the shaft section 20 in FIG. 3 is the two floor panels 46 and 48 shown as examples. In this regard, FIG. 5 may also serve to illustrate the connection between the yaw drives 28 and their sprockets 30 and the cog 32 in the meshing area 34. For further explanations of FIG. 4, please see the notes to FIG. 3. A shaft section is therefore proposed, which may also be referred to as a yaw module, and is located between the nacelle and the tower. At its lower end, this yaw module is connected to the yaw bearing and therefore coupled to the tower. The yaw bearing is positioned at a yaw displacement of, e.g., 2.5 m lower than the nacelle and therefore also 2.5 m lower than before.

The bearing load can therefore be reduced, or at least is not increased. The yaw module can be formed as a cast part, thereby allowing cost savings for the tower. Nacelle costs may increase. However, there is good access to the yaw drives and generally increased space requirements and increased space available.

The proposed arrangement of yaw drives can be used in multiple, and these can preferably be installed in their openings from above. By using the shaft section or yaw module, less crane height is required when constructing a wind energy plant. This is justified in the case that the nacelle has a pulled down skirt which must first be raised over of the top of the tower. Now the yaw module can be attached to the nacelle, and the nacelle and yaw module only need to be raised to the exact height where they will be installed.

The proposed internal teeth also allow for better meshing of the sprockets in the yaw drives with these teeth than with external teeth, because the cog with internal teeth curves in towards the sprockets instead of away from them, meaning the sprockets can be better in mesh.

The yaw module can only be manufactured separately and connected to the nacelle or a corresponding nacelle support later. The nacelle 4 shown in FIGS. 3 and 4 can also be called a nacelle support.

Thus the air, i.e., the outside air, being sucked into the shaft section through openings and then channeled further into the nacelle, is prevented from passing through the yaw bearing, since here it is being sucked in above the yaw bearing, i.e., above the bearing grease and the drives, i.e., the cog with internal teeth and the sprockets of the yaw drives.

In a cylindrical shaft section, better ventilation openings for sucking in outside air can be provided in particular for structural reasons. It is also advantageous that individual elements, specifically the yaw drives, can be better tested separately, as these can be tested alone in the shaft section without a nacelle.

If, depending on the tower, the shaft section can also be designed to be slightly conical, as proposed pursuant to an embodiment, the shaft section in the area of the yaw bearing will have a slightly larger diameter than where it connects to the nacelle. This results in even more space for the yaw drives in the area. This also allows loads to be better distributed on the yaw bearing.

In addition to the advantageous construction of the wind energy plant, there are also transportation advantages because the yaw module can be delivered separately and attached to the nacelle on site.

The invention claimed is:

1. A method comprising:
    determining an anticipated pitching moment of a wind energy plant to be formed, wherein the wind energy plant to be formed comprises a nacelle, a generator located in the nacelle, a tower, a single yaw bearing on top of the tower, and a vertical shaft section supporting the nacelle;
    determining an anticipated, height-dependent thrust moment of the wind energy plant to be formed for nominal operation of the wind energy plant;
    determining a height position in which a total of the anticipated pitching moment and the anticipated, height-dependent thrust moment is at a minimum;
    identifying the height position as a position of the single yaw bearing of the wind energy plant to be formed; and
    forming the tower of the wind energy plant and installing the single yaw bearing at the height position, wherein a vertical shaft section extends above the yaw bearing.

2. The method according to claim 1, further comprising installing the nacelle onto an upper end of the vertical shaft section.

3. The method according to claim 1, wherein determining the anticipated pitching moment includes determining the anticipated pitching moment based on a weight of the nacelle and a center of gravity of the nacelle.

4. The method according to claim 1, wherein determining the anticipated, height-dependent thrust moment of the wind energy plant to be formed for nominal operation of the wind energy plant includes using a nominal wind at a site at which the tower is formed to determine the anticipated, height-dependent thrust moment of the wind energy plant.

\* \* \* \* \*